July 5, 1960     E. E. SHIPLEY     2,943,463
GREASE SEAL FOR HIGH SPEED FLEXIBLE COUPLING
Filed Nov. 23, 1959

Inventor
Eugene E. Shipley
by W. C. Crutcher
His Attorney 2,943,463
Patented July 5, 1960

United States Patent Office

2,943,463
GREASE SEAL FOR HIGH SPEED FLEXIBLE COUPLING

Eugene E. Shipley, Middleton, Mass., assignor to General Electric Company, a corporation of New York Filed Nov. 23, 1959, Ser. No. 854,856

5 Claims. (Cl. 64—9)

This invention is concerned with a high speed flexible coupling assembly, and more particularly it relates to a grease seal for such a coupling which reduces the tendency for the coupling lubricant to axially separate the coupled shafts due to centrifugal force on the grease.

In high speed couplings, of the type where the grease or other lubricant is retained in a rotating enclosure, centrifugal force causes the grease, due to its plasticity, to seek out the radially outermost portions of the enclosure. Thus the grease acts much like a liquid which exerts a pressure on the sides as well as on the bottom of its container. Due to the centrifugal force, the internal pressure in the grease, and in liquid lubricants as well, can become quite high. This causes the lubricant to impose a substantial axial thrust in opposite directions on the radially disposed walls retaining the grease, due to the difference between the pressure in the grease and the outside air pressure. If the radially disposed end retaining walls are both on the same member, this axial thrust force will be internally resisted by the member, but if one retaining wall is on one of the coupled shafts and the other retaining wall is on the other of the coupled shafts, the reaction forces will tend to exert opposing thrust forces which will tend to separate the two shafts.

Naturally, the portion of the coupling to be lubricated, for example the spline teeth, must lie within the lubrication enclosure between the radial retaining walls of the coupling in order to be surrounded by lubricant. This means that one of the retaining walls generally has to be removed if the coupling members are to be axially separated, since the spline teeth must lie between the lubricant retaining walls.

It can be seen therefore that two alternatives are available. If the one retaining wall is to be firmly attached to the same coupling member as the other retaining wall, in order to eliminate the shaft separating action arising from centrifugal force on the grease, this retaining wall must be fashioned in a manner to be attached after the coupling has been assembled. In many types of installation, this approach would be undesirable. For example, where a device having a casing enclosing a driven shaft is to be mounted to a piece of machinery from which projects a stub driving shaft, both the driving and driven shaft are covered up as the accessory unit is assembled to the machine, resulting in a so-called "blind assembly." In such a case, it would be quite difficult to attach a grease seal retaining wall after the assembly of the coupling has already taken place, due to the fact that the casing completely covers the coupling.

The alternative would be to fashion the coupling in such a manner that the one grease retaining wall was attached to one coupling member and the other retaining wall to the other coupling member so that the "blind assembly" could easily take place. In this case, however, the thrust forces caused by centrifugally induced pressure in the grease, will tend to impose undesirable thrust forces on the coupled shafts as described previously. Furthermore, the greatest tendency toward leakage of the lubricant is at the radially outermost point of the coupling. Since substantial clearances must be provided in a flexible coupling in order to allow one shaft to become angularly misaligned with the other shaft, this clearance gap would be a potential source of leakage and would present a difficult sealing problem.

Accordingly, one object of the present invention is to provide an improved grease seal for a flexible coupling which reduces thrust forces imposed on the coupled shafts due to centrifugal force on the grease.

Another object is to provide an improved high speed flexible coupling assembly suitable for a "blind assembly" of the components.

Another object is to provide a coupling that can be easily assembled and disassembled without further attention to attachment of the lubricant sealing members.

Still another object is to provide a flexible coupling which can be axially disengaged while at a standstill, but which is locked against axial disengagement while operating.

Another object is to provide an improved centrifugally actuated grease retaining ring for a flexible coupling.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which.

Generally stated, the invention is practiced by providing a separate lubricant retaining ring which provides one radial wall of the lubricant cavity enclosing the coupling interlocking members. Means responsive to centrifugal force are provided to move the retaining ring toward the opposite lubricant retaining wall in order to counteract the thrust reaction of the centrifugal force acting upon the grease. The means actuating the retaining ring is designed so as to hold the retaining ring in equilibrium during rotation so as to balance the grease force.

Figure 1:
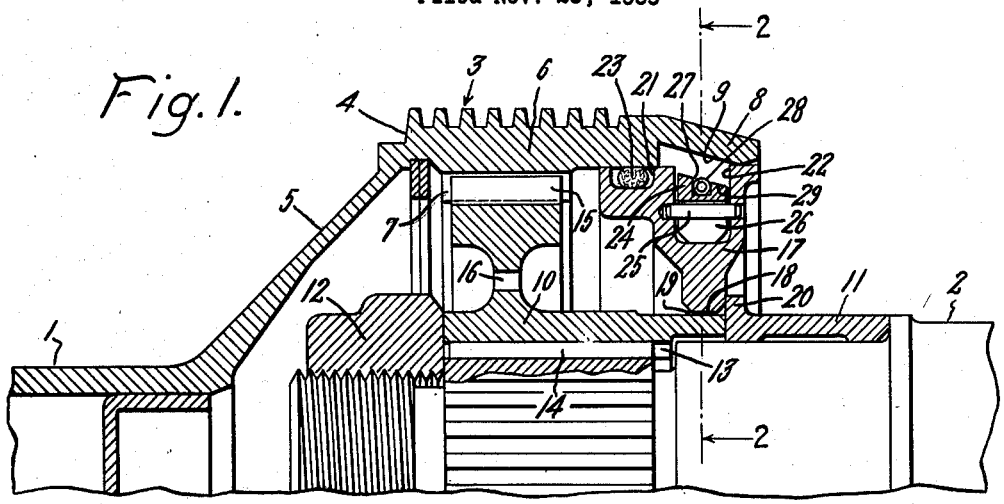
Fig. 1 is a horizontal elevation in section of a high speed flexible coupling utilizing the invention.

Referring now to Fig. 1 of the drawing, a driven shaft 1 is shown connected to a driving shaft 2 by a coupling assembly shown generally at 3. Driven shaft 1 terminates in an enlarged end portion 4 comprising a generally radially extending flange portion 5 and an axially extending cylindrical portion 6. The cylindrical portion 6 has internal spline teeth 7 cut on the internal bore thereof which may be of any type suitable for torque transmission. Cylindrical portion 6 also defines an extending lip portion 8 which defines an internal frustro-conical surface 9.

The driving shaft 2 carries the male torque-transmitting member 10 of the coupling between a spacer ring 11 and a nut 12 threaded to shaft 2 in a manner which will be obvious from the drawing. The male coupling member 10 defines a bore with internal teeth 13 mating with similar external teeth 14 machined on shaft 2 so that member 10 is constrained to rotate with shaft 2 as though it were an integral portion thereof. The method of connecting member 10 to shaft 2 is for convenience only and forms no part of the present invention, inasmuch as member 10 might also be manufactured integral with shaft 2. The male coupling member 10 defines external spline teeth 15 which cooperate with spline teeth 7 of the driven shaft 1 to transmit torque between the shafts. It will be obvious to those skilled in the art that sufficient radial clearance is provided during the manufacture of spline teeth 7, 15 to allow the degree of angular misalignment anticipated during operation of the flexible coupling. Axial ports 16 cut in the web of member 10 allow free access of lubricant from one side of member 10 to the other.

Disposed inside of the anular lip 8 of the enlarged end portion 4 is a grease retaining ring 17. Retaining ring 17 defines an internal bore 18 which separates it from member 10 by a clearance gap 19 in order to allow retaining ring 17 to slide freely along the shaft. A radially extending lip 20 on spacer ring 11 prevents retaining ring 17 from moving axially beyond a predetermined point on shaft 2. The outer portion of retaining ring 17 defines two circumferential grooves 21, 22. Groove 21 which is disposed inside the cylindrical portion 6 holds a sealing member such as O-ring 23, but any suitable gasket or sealing means could be substituted.

Figure 2:
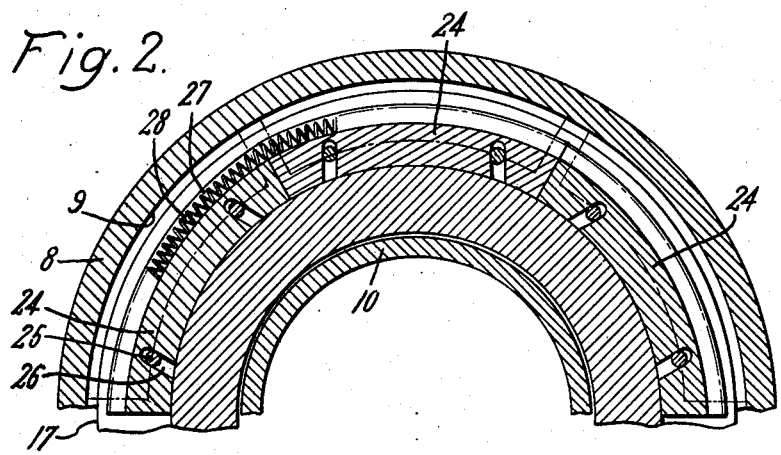
Fig. 2 is a view taken along the lines 2—2 of Fig. 1.

The circumferential groove 22 contains a number of radially slidable arcuate segments 24. Reference to Fig. 2 of the drawing will illustrate more clearly the structure of segments 24, where it is seen that there are six arcuate segments so disposed as to slide freely in a radial direction on retaining pins 25 by virtue of grooves 26 which are cut in segments 24 so as to lie parallel to a radial line from the center of each segment. Although the pins 25 are shown as being axially disposed, the segments 24 could also be mounted in other ways for radial movement, such as on suitable radial pins. Each of segments 24 has an arcuate groove 27 cut in the periphery thereof which, when all of the segments are in the innermost position, define a circumferential groove around all of the segments for containing a garter spring 28. Garter spring 28 serves to hold segments 24 in their contracted or radially innermost position but permits outward movement of segments 24 under the action of centrifugal force. It is particularly to be noted that the outer arcuate surfaces 29 of segments 24 together define a frusto-conical surface parallel to surface 9 of the annular lip 8. When the segments 24 are in their radially outermost position, surfaces 9 and 29 will contact one another and further outward radial force on segments 24 will provide an axial component on retaining ring 17, urging it to the left, as illustrated in Fig. 3.

The operation of the improved coupling assembly will be apparent from the following description. When the coupling is not rotating, segments 24 are in their fully retracted position as held by garter spring 28 and as shown in Fig. 1. The lubricating cavity of the coupling, defined by walls 5, 6 and retaining ring 17, contains grease for lubricating spline teeth 7, 15. As the coupling starts to rotate, the grease centrifuges toward the radially outermost portions of cylindrical portion 6. At the same time it begins to exert axial reaction forces on wall 5 and on retaining ring 17. Since retaining ring 17 is, in turn, prevented from moving by lip 20, this axial reactive force would normally tend to move shafts 1 and 2 apart.

It will be observed that retaining ring 17 is not attached to either coupling member. The friction caused by O-ring 23, however, will cause the retaining ring to rotate along with shaft 1. When the retaining ring 17 rotates, of course, segments 24 are acted upon by centrifugal force, and spread apart against the action of garter spring 28 as shown more clearly by the phantom lines in Fig. 2. As the speed begins to build up, surfaces 9 of segments 24 press against the frusto-conical surface 9 and urge retaining ring 17 to the left, so as to counteract the thrust of the grease pressure which is biasing ring 17 to the right. This operating position of the retaining ring may be seen by reference to Fig. 3 of the drawing. Thus an equilibrium is reached between the grease pressure and the centrifugally responsive retaining ring 17, since retaining ring 17 will move to the left until this equilibrium position is attained.

Figure 3:
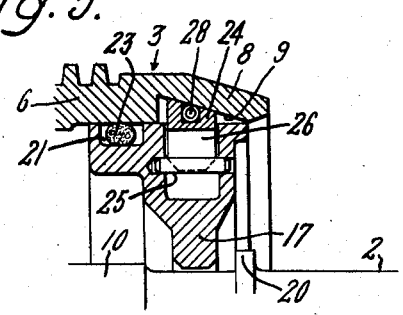
Fig. 3 is a view of a portion of Fig. 1 showing the grease seal as it appears when the coupling is rotating.

It will be apparent from Fig. 3 that axial clearance is now provided between lip 20 on the shaft 2 and the retaining ring 17. This is quite important in the operation of a flexible coupling, inasmuch as shaft 2 may become misaligned with shaft 1 in operation so that any rubbing would promote severe wear at the intersection of lip 20 and ring 17. With the construction shown, retaining ring 17 is axially displaced from its contact with lip 20 during operation and no wear can occur.

The angles that the frusto-conical surface 9 and corresponding surface 29 on the segments 24 form with the shaft axis will vary with the design of the coupling. Moreover, the weight of segments 24 and their radius of rotation must be in a proper relation with the characteristics of the grease used. The proper functioning of the device depends upon maintaining static equilibrium between the thrust exerted by the grease and the thrust exerted by the retaining ring through segments 24 when the coupling is at the proper operating speed. Naturally, the quantity or weight of lubricant in the coupling affects the axial thrust exerted by it. In order to prevent the necessity of weighing the amount of lubricant, it is desirable to design the segments 24 so that they exert a slightly greater force to the left than the anticipated weight of lubricant will exert to the right. This prevents any difficulty in case too much lubricant is inadvertently added to the coupling. The design of the members to accomplish this result lies easily within the capability of one skilled in the art once the underlying concept is understood.

It will be apparent that O-ring 23 prevents the grease in the lubricating cavity from escaping past retaining ring 17. It will also be apparent that O-ring 23 will function equally well in any axial position of retaining ring 17.

An important feature of the invention lies in the fact that the shafts are locked against axial displacement relative to one another while operating, but are unlocked while at a standstill. This action takes place with zero net thrust on either shaft 1 or 2. The coupling is thus especially suitable for a "blind assembly," since when the shafts are at a standstill, the segments 24 are retracted, as in Fig. 1, and shaft 1 can be easily disengaged by axially sliding it apart from shaft 2, the annular lip 8 clearing the tops of segments 24. Thus the casing of the device containing the driven shaft 1 can completely enclose both shaft 1 and the extending portion of shaft 2 without any fear of accidental disengagement of the shafts from one another during operation. Likewise, security of the grease seal is accomplished without any need for further manipulation of sealing members after assembly of the coupling members has taken place. Hence, during assembly, the cavity of the enlarged end portion 4 may simply be filled with grease and slid over the male coupling member 10 and the retaining ring 17. The retaining ring is prevented from moving by lip 20. Assembly can take place without the operator seeing what is occurring, with the assurance that the seal will be accomplished by O-ring 23 and that the centrifugally actuated segments 24 will prevent any forces tending to thrust shafts 1 and 2 apart from one another when the coupling is at operating speed.

Thus it can be seen that my improved flexible coupling assembly incorporates a centrifugally actuated lubricant seal which effectively balances any shaft-separating axial thrust which may be caused by the grease or other lubricant due to its internal, centrifugally induced pressure. The means used to accomplish the seal also prevent the shafts from being accidentally separated while turning, but retract automatically while the shafts are stationary, thus adapting the coupling to be ideal for a "blind assembly."

Many modifications of the invention will naturally occur to those skilled in the art. For instance, the segments 24 are only one type of centrifugally actuated means which might be used to impose an axial thrust on the retaining ring 17. The important feature here is that means be provided to move the retaining ring in a direction so as to reduce the size of the rotating grease cavity, since the centrifugal force on the grease will tend to enlarge the volume of the lubricating cavity.

These and many other advantages will be apparent to those skilled in the art and while there has been described what is at present considered to be the preferred embodiment of the invention, it will be understood that still other modifications may be made, and it is intended to cover in the appended claims all such modifications as fall within the true spirit and scope of this invention.

What I claim as new and desire to secure by Letters Patent of the United States is:

1. A high speed flexible coupling comprising a first rotatably mounted shaft including an enlarged hollow end portion defining torque-transmitting means therein, a second rotatably mounted shaft including a male end portion substantially coaxially disposed within said hollow end portion and defining second torque-transmitting means engaged with said first torque-transmitting means, an axially slidable lubricant retaining ring disposed in sealing relationship with said first shaft hollow end portion to define an annular lubricant chamber therewith containing the first and second torque-transmitting means, and means responsive to centrifugal force urging said retaining ring axially in the direction of the first shaft so as to reduce the volume of said lubricant chamber.

2. A high speed flexible coupling comprising a first rotatably mounted shaft including an enlarged hollow end portion defining internal spline teeth, a second rotatably mounted shaft including a male end portion substantially coaxially disposed within said first shaft end portion and defining external spline teeth engaged with said internal spline teeth, an axially slidable lubricant retaining ring disposed between the second shaft and the hollow end portion and defining together with the hollow end portion an annular lubricant chamber containing the spline teeth, sealing means disposed between the hollow end portion and said retaining ring to prevent the escape of lubricant therebetween, and means responsive to centrifugal force urging said retaining ring axially in the direction of the first shaft so as to reduce the volume of said lubricant chamber.

3. A high speed flexible coupling comprising a first rotatably mounted shaft including an enlarged hollow end portion, said hollow end portion defining internal spline teeth and also defining an internal frusto-conical surface on the side of the spline teeth opposite the shaft, a second shaft including a male end portion substantially coaxially disposed within the first shaft end portion and defining external spline teeth engaged with said internal spline teeth to transmit torque between the first and second shafts while allowing angular misalignment therebetween, an axially slidable lubricant retaining ring loosely disposed on said second shaft and in sealing relation with the hollow end portion to define therewith an annular lubricant chamber containing the meshing spline teeth, radially movable means disposed on the retaining ring and cooperating with said frusto-conical surface so as to exert an axial force component on said retaining ring in a direction to reduce the volume of said lubricant chamber when the coupling is rotating, and resilient means to urge the radially slidable means radially inward from the frusto-conical surface, whereby the first shaft may be disengaged from the second shaft when the coupling is stationary.

4. A high speed flexible coupling comprising a first rotatably mounted shaft including an enlarged hollow end portion defining internal spline teeth and terminating in an annular lip portion having a smooth frusto-conical surface on the internal wall thereof, a second rotatably mounted shaft including an end flange portion substantially coaxially disposed within said first shaft end portion and defining external spline teeth engaged with said first shaft internal spline teeth, an axially slidable lubricant retaining ring loosely disposed on said second shaft and defining together with the first shaft hollow end portion an annular lubricant chamber containing the spline teeth, said retaining ring defining a circumferential groove disposed opposite said frusto-conical surface, a plurality of arcuate segments circumferentially disposed end to end in said circumferential groove and defining outer surfaces adapted to cooperate with said frusto-conical surface to exert an axial side thrust on the retaining ring, resilient means encircling said plurality of segments and uring them toward a retracted position within said circumferential groove, and sealing means disposed between the retaining ring and the hollow end portion to prevent the escape of lubricant therebetween.

5. A high speed flexible coupling comprising a first rotatably mounted shaft including an enlarged hollow end portion defining internal spline teeth and also including an axially extending cylindrical portion having a cylindrical bore and terminating in an annular lip, said lip defining a frusto-conical surface on the internal wall thereof, a second rotatably mounted shaft including a male end portion substantially coaxially disposed within said first shaft end portion and defining external spline teeth engaged with said first shaft spline teeth, an axially slidable lubricant retaining ring loosely disposed on said second shaft and defining together with said first shaft hollow end portion an annular lubricant chamber containing the meshing spline teeth, said retaining ring defining first and second axially spaced circumferential grooves, said first groove being disposed opposite the axially extending cylindrical bore surface and said second groove being disposed opposite the frusto-conical surface, sealing means disposed in said first groove between the retaining ring and the bore surface whereby said retaining ring may move axially without destroying the seal, a plurality of arcuate segments circumferentially disposed end to end in said second circumferential groove and defining outer surfaces cooperating with the frusto-conical surface, whereby an axial thrust will be exerted on the retaining ring under the influence of centrifugal force so as to move the retaining ring in the direction of decreasing volume of the lubricant chamber, and spring means encircling said plurality of segments so as to urge them toward a retracted position in the second circumferential groove, whereby the segments are retracted to allow disengagement of the first and second shafts when they are not rotating.

References Cited in the file of this patent

UNITED STATES PATENTS

| | | |
|---|---|---|
| 2,655,014 | Walker | Oct. 13, 1953 |
| 2,744,395 | Massey et al. | May 8, 1956 |
| 2,842,945 | Swanson | July 15, 1958 |
| 2,906,106 | Haas | Sept. 29, 1959 |